United States Patent [19]

Yoneyama

[11] Patent Number: 4,811,922
[45] Date of Patent: Mar. 14, 1989

[54] FLAT WIRE HARNESS ATTACHING UNIT
[75] Inventor: Norihiro Yoneyama, Aichi, Japan
[73] Assignee: Yazaki Corporation, Tokyo, Japan
[21] Appl. No.: 229,418
[22] Filed: Aug. 8, 1988
[30] Foreign Application Priority Data Aug. 31, 1987 [JP] Japan .............................. 62-133161[U]

[51] Int. Cl.⁴ .......................... H02G 3/02; B60R 16/02
[52] U.S. Cl. ..................................... 248/73; 24/704.1;
248/71; 248/548; 174/72 A
[58] Field of Search .................... 174/72 A; 307/10 R;
248/68.1, 71, 73, 548; 24/704; 292/307 A, 318,
319, 320, 321

[56] References Cited
U.S. PATENT DOCUMENTS 4,245,374 1/1981 Suzuki ............................... 24/704 X

FOREIGN PATENT DOCUMENTS 555745 9/1943 United Kingdom ............. 174/72 A
1452058 10/1976 United Kingdom ............. 174/72 A
2191348 12/1987 United Kingdom ............. 174/72 A Primary Examiner—Laramie E. Askin
Attorney, Agent, or Firm—Armstrong, Nikaido, Marmelstein & Kubovcik

[57] ABSTRACT

A flat wire harness attaching unit comprises an attaching plate with a clip vertically projecting therefrom to be insertedly fixed into a hole in an automobile, a base plate with a catch member also vertically projecting therefrom to be engaged with the clip, and a laminated sheet capable of being compositely fixed to an insulating cover of a harness to be clamped between the attaching plate and the base plate. The unit is characterized in that support shoulders provided in a catch hole of the clip are formed in bridge-like shape, having a strength with the degree of which in the case that the catch member is forcibly pulled down, a bifurcated claw provided on the catch member is not damaged although the support shoulders are destroyed, so that the harness can be relocated and reused.

5 Claims, 2 Drawing Sheets

FLAT WIRE HARNESS ATTACHING UNIT

BACKGROUND OF THE INVENTION

1. Field of the Invention

The present invention relates to an improved flat wire harness attaching unit for fixedly attaching a flat wire harness formed by bundling a plurality of wires or conductors in a flat integral shape to the body of an automobile.

2. Description of the Prior Art

Conventionally, attaching a flat wire harness (hereinafter referred to as "harness") to the body of an automobile has been done by taping the harness to a mounting board having a clip vertically projecting therefrom and insertedly fixing the clip into a hole in the body or panel of the automobile. However, the taping process for binding the wire harness requires a troublesome work and consequently takes a long time. Besides, apart from its low productivity caused by the above manual operation, the binding effect of the tapes deteriorates due to the aging of the tapes.

To improve these defects, the applicant had suggested a new type of the flat wire harness attaching unit as shown in FIG. 4 and FIG. 5 (Refer to published UK patent application No. 2,191,348 at FIGS. 57 through 60B therein). In FIGS. 4 and 5, 1 denotes an attaching plate of rectangular shape with a clip 2 vertically projecting therefrom to be insertedly fixed into a hole in the automobile, 3 a base plate with a catch member 4 to be engaged with the clip 2, 5 a laminated sheet capable of being compositely fixed to the insulating covering layer 6 of the harness through adhesion or fusion thereto. If the harness W is formed by a vinyl-covered wire 7, the laminated sheet 5 is formed up by laminating a thermally and mechanically strong polyester or a synthetic resin layer 5b such as a polyamide resin on a polyvinyl chloride layer 5a which is easily compounded with the insulating covering layer 6 (polyvinyl chloride).

To fix the harness W, thread the catch member 4 through a central opening 5c of the laminated sheet 5, and insert it into the hollow body 2a of the clip 2, and engage the bifurcated claw 4a formed at an edge of the catch member 4 with a catch hole 2b of the body 2a so as to clamp the sheet 5 between the attaching plate 1 and the base plate 3, and then fix the sheet 5 to the insulating covering layer 6 of the harness W through adhesion or fusion thereto. Then slidably insert the clip 2 into a hole in the automobile and engage the arm portion 2c having a shoulder section 2d at its lower end with the hole.

SUMMARY OF THE INVENTION

The device shown in FIGS. 4 and 5 can securely fix the harness W without using tapes, but once it is fixed by engaging the catch member 4 with the clip 2 by means of the corresponding bifurcated claw 4a and the catch hole 2b, it cannot be removed afterwards. In other words, when the catch member 4 is forcibly pulled, the bifurcated claw 4a is torn to pieces or cut off by the side wall (hollow body or barrel 2a), so that it cannot be reused afterwards. Thus, in the case that the harness W is to be removed from the body of the automobile or that it has been mounted in a wrong place, the harness W must be replaced with a new one.

The object of the present invention is to solve the foregoing problems in the prior art, by providing a harness attaching unit which is removable from a clip section at the automobile side without damaging a catch member at the harness fixing side outside the automobile when the harness is forcibly pulled down.

DETAILED DESCRIPTION OF THE EMBODIMENTS

Figure 1:
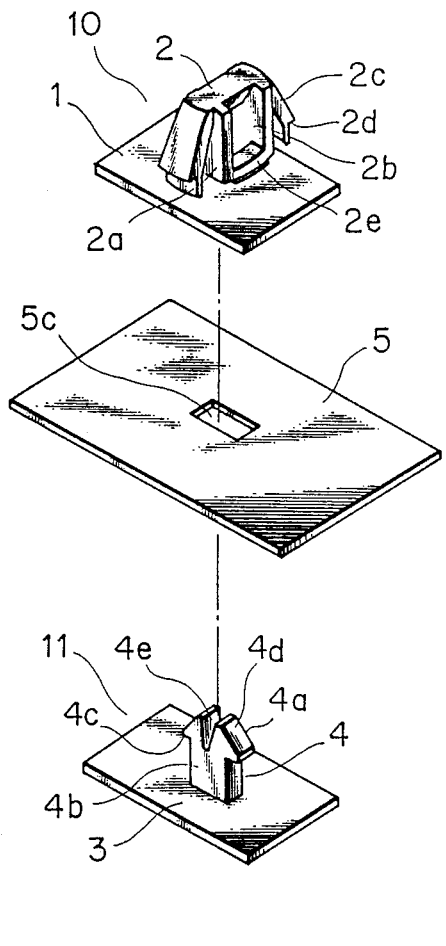
FIG. 1 is an exploded view of an embodiment according to the present invention.
Figure 4:
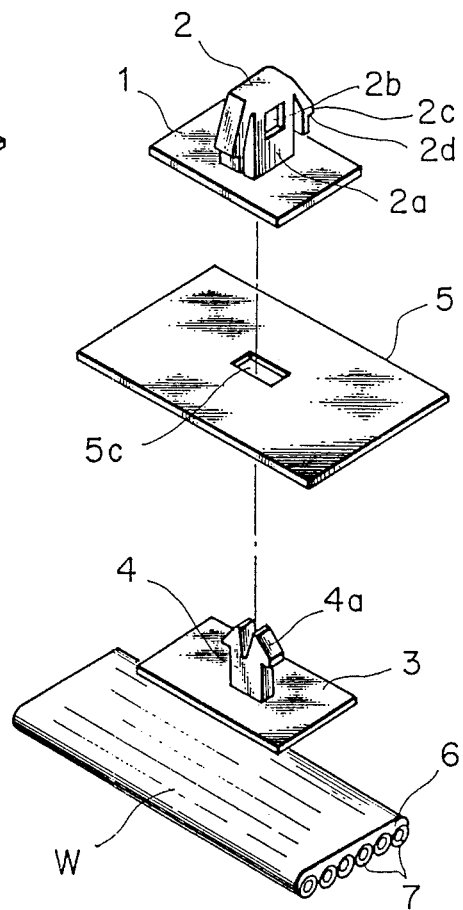
FIG. 4 is an exploded perspective view of the conventional attachment.
Figure 2:
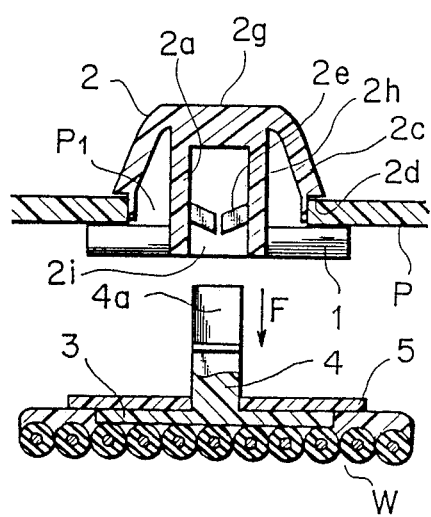
FIG. 2 is a sectional view of FIG. 1 showing its operation in such a state of the device that a catch member is pulled down from a clip with a support shoulder destroyed.

The harness attaching unit according to the present invention, as shown in FIGS. 1 and 2, has an attaching member or attaching means 10, a catch member or catching means 11 fixed to a flat wire harness and a laminated sheet 5. The attaching member 10 has a base or attaching plate 1 of rectangular shape fixedly or integrally provided with a clip 2 upwardly projecting from the center of the attaching plate 1. The clip 2 is composed of a head 2g having an upper flat of dimension smaller than the car body hole P1 in car body P and a pair of arm portions 2c of downwardly divergent profile whose lower ends each has a shoulder 2d engageable with the periphery of car body hole P1 so as to be capable of drawing out the clip 2 from the hole P1 with a mean force. The head 2g is connected with the barrel portion or body 2a composed of two parallel walls 2h extending vertically and spaced apart to form a catch hole or catch room 2b therebetween and two lower bridges or support shoulders 2e connecting the lower ends of the walls 2h and providing a lower opening 2i defined by the walls 2h and the bridges 2e. Into the interior of the barrel 2a is inserted a catch member or catch section 4 fixedly provided in the flat wire harness. The catch member 4 is fixed in a base plate 3 of rectangular shape and protrudes upwardly from the center of the base plate 3. The catch member or catch section 4 has a lower portion 4b of rectangular cross section the same as a rectangle defined by the walls 2h and bridges 2e of the attachment clip 2 and a bifurcated claw 4a composed of two shoulders 4c at the lower end, opposed slopes 4d downwardly divergent and a notch 4e. A pair of support shoulders 2e inside the catch hole or catch room 2b to be engaged with the above-mentioned bifurcated claw 4a are formed respectively in a bridge-like shape, the strength of which is smaller than the tearing (or destructive) force caused by the bifurcated claw 4a, so that the support shoulders 2e are destroyed by pulling down the catch member 4, by which the base plate 3 becomes removable.

Figure 3A:
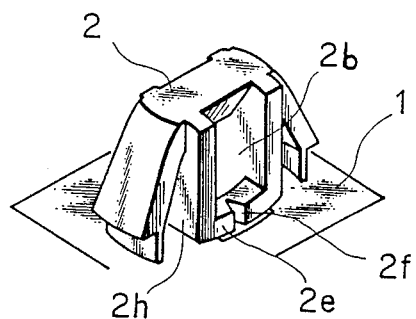
FIG. 3a and FIG. 3b are perspective views respectively showing second and third embodiments of the clip in FIG. 1.
Figure 3B:
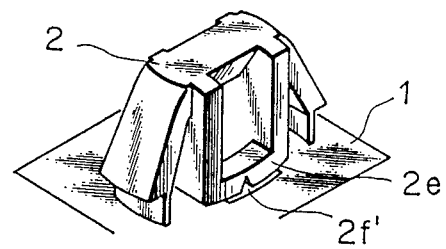
Figure 5:
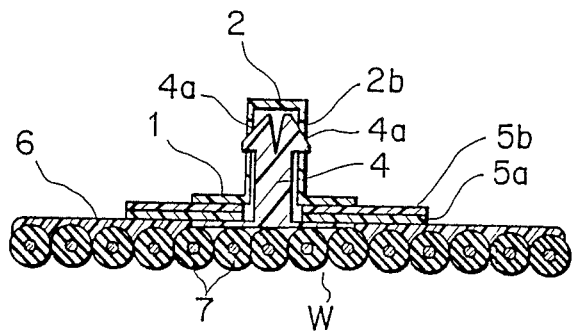
FIG. 5 is a sectional schematic view of the conventional attachment in FIG. 4.

The support shoulders 2e to be engaged with the bifurcated claw 4a are formed respectively in a thin bridge-like shape, and as shown in FIG. 2, they are provided with the strength with the degree of which the bifurcated claw 4a is not damaged while the support shoulders 2e are destroyed when the catch member 4 mounted on the harness W is pulled down with a large force F. As shown in FIGS. 3a and 3b, each of these support shoulders 2e can be formed thickly enough, so that a cut groove 2f open towards outside or another cut groove 2f open downward is provided respectively in its center portion.

In FIG. 1, a side wall of the catch hole 2b provided in the body 2a of the clip 2 is fully open, but as a matter of fact, it can be closed leaving some length for engaging the bifurcated claw 4a.

Operation

As shown in FIG. 2, according to the present invention, as the support shoulders 2e in the catch hole 2b are destroyed when the catch member 4 is pulled down, the harness W can be removed without causing any damage to the bifurcated claw 4a of the catch member 4. Therefore, when the clip 2 damaged at the panel P side is separated from the attaching plate 1 by tearing it off with pliers, the base plate 3 with the catch member 4 mounted thereon is left undamaged. Consequently the above harness W can be used by replacing the clip section only.

Effect of the Invention

As explained above, by using the unit according to the present invention, the catch section at the harness fixing side can be safely removed from the clip section provided in association with a vehicle body side, so that the harness fixed to the base plate can be relocated and reused.

What is claimed is:

1. A flat wire harness attaching unit for attaching a flat wire harness to the body or a panel of an automobile, the flat wire harness having a plurality of wires arranged in a plane and integrally connected, the unit comprising:
    an attaching means including a bottom plate having a dimension larger than a hole provided in the automobile body and an upper clip upwardly projecting from the plate and being insertable by deformation into a hole provided in the automobile body and normally incapable of drawing out without rupture of some portion once inserted, and
    a catching means having a base plate for fixing to the flat wire harness and a catch section perpendicularly extending from the base plate to be engaged with said clip of the attaching means;
    characterized in that the attaching means has a means for providing a support to be engaged with said catch section and having a dimension and a material capable of rupturing when said catch section is forcibly pulled out so that the attaching means is made removable from the hole of the automobile body.

2. A flat wire harness attaching unit for attaching a flat wire harness to the body or a panel of an automobile, the flat wire harness having a plurality of wires arranged in a plane and integrally connected, the unit comprising:
    an attaching means including a bottom plate having a dimension larger than a hole provided in the automobile body and an upper clip upwardly projecting from the plate and being insertable by deformation into a hole provided in the automobile body and normally incapable of drawing out without rupture of some portion once inserted, and
    a catching means having a base plate for fixing to the flat wire harness and a catch section perpendicularly extending from the base plate to be engaged with said clip of the attaching means;
    characterized in that the clip of the attaching means has a head insertable into the hole of the automobile body and a barrel provided with a catch room for receiving the catch section, and the barrel has a support shoulder for the catch section, the support shoulder having a strength less than a tearing force of said catch section so that said base plate of the catching means is removable when said catch section is pulled down to rupture the support shoulder.

3. A flat wire harness attaching unit for attaching a flat wire harness to the body or a panel of an automobile, the flat wire harness having a plurality of wires arranged in a plane and integrally connected, the unit comprising:
    an attaching means including a bottom plate having a dimension larger than a hole provided in the automobile body and an engagement clip upwardly projecting from the plate and being insertable by deformation into the hole of the automobile body and normally incapable of drawing out without rupture of some portion once inserted,
    a catching means having a base plate for fixing to the flat wire harness and a catch section perpendicularly extending from the base plate to be engaged with said clip,
    characterized in that the clip of the attaching means has a head insertable into the hole of the automobile body and a barrel provided with a catch room for receiving the catch section, the head has a pair of deformable arms downwardly extending from the head and divergent around the barrel, and the barrel has a pair of vertical walls arranged to define the catch room and a pair of bridge portions arranged in parallel and spaced apart and connecting both of the walls at their lower ends and defining together with the walls an inlet opening for the catch room.

4. A flat wire harness attaching unit as claimed in claim 3, wherein the bridge portions have a notch for making rupture easy.

5. A flat wire harness attaching unit comprising:
    an attaching plate with a clip vertically projecting therefrom to be slidably fixed to a hole of the body or the like of an automobile,
    a base plate having a catch section to be engaged with said clip,
    a laminated sheet capable of being compositely fixed to an insulating cover of a flat wire harness, and
    a pair of bifurcated claws provided at a point of said catch section to be engaged with a catch hole provided in a hollow body of said clip,
    characterized in that a pair of support shoulders provided inside said catch hole to be engaged with said bifurcated claws are formed respectively in a bridge-like shape with the strength less than a tearing force of said bifurcated claws, so that said base plate when fixed to a flat wire harness becomes removable when said catch section is pulled down to destroy said support shoulders.

* * * * *